United States Patent

Waite

[11] 4,385,754
[45] May 31, 1983

[54] SPRING-BIASED LOST-MOTION LINK ASSEMBLY

[75] Inventor: Lynn E. Waite, Gasport, N.Y.

[73] Assignee: General Motors Corporation, Detroit, Mich.

[21] Appl. No.: 244,320

[22] Filed: Mar. 16, 1981

[51] Int. Cl.³ .............................................. F16F 1/12
[52] U.S. Cl. ...................................................... 267/71
[58] Field of Search ........................ 267/69, 70, 71, 72; 403/13, 341, 364

[56] References Cited

U.S. PATENT DOCUMENTS

| 535,760 | 3/1895 | Hoffman et al. | 267/72 |
| 797,262 | 8/1905 | Bryce | 267/72 |
| 912,927 | 2/1909 | Winans | 267/72 |
| 1,444,452 | 2/1923 | Bigelow | 267/72 |
| 1,552,886 | 9/1925 | Shultz | 74/470 |
| 1,603,977 | 10/1926 | Olmstead | 267/72 |
| 2,178,538 | 11/1939 | Erbguth | 74/579 |
| 2,489,924 | 11/1949 | Oates | 74/469 |
| 2,830,465 | 4/1958 | Eskridge | 74/582 |
| 3,078,738 | 2/1963 | Siegel | 74/579 |
| 3,110,486 | 11/1963 | Brenner | 267/71 |
| 3,257,852 | 6/1966 | Perkins | 73/414 |
| 4,018,098 | 4/1977 | Beier | 74/470 |

Primary Examiner—Robert J. Spar
Assistant Examiner—R. R. Diefendorf
Attorney, Agent, or Firm—R. L. Phillips

[57] ABSTRACT

A spring-biased lost-motion link assembly comprising a pair of identical interlocking link members with a compression-coil spring operatively arranged therebetween. Each link member has a pair of longitudinally extending grooves for receiving a terminal prong portion on the other link member in their normal undeflected state with the spring assembled thereon to thereby define a tongue and groove interlock between the link members.

2 Claims, 5 Drawing Figures

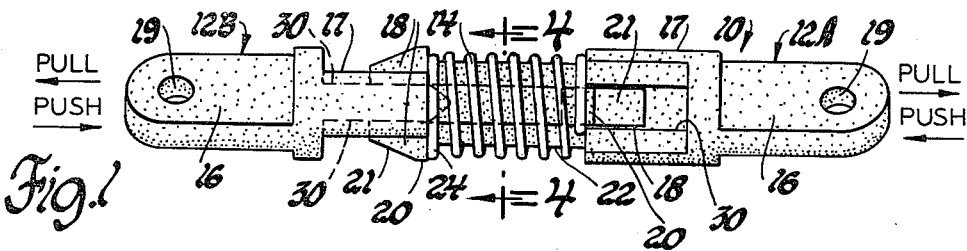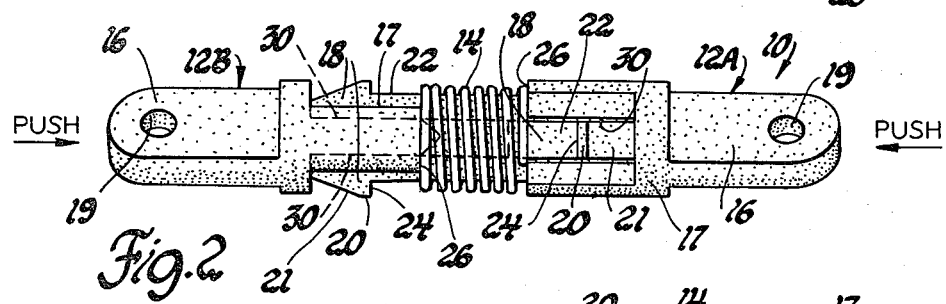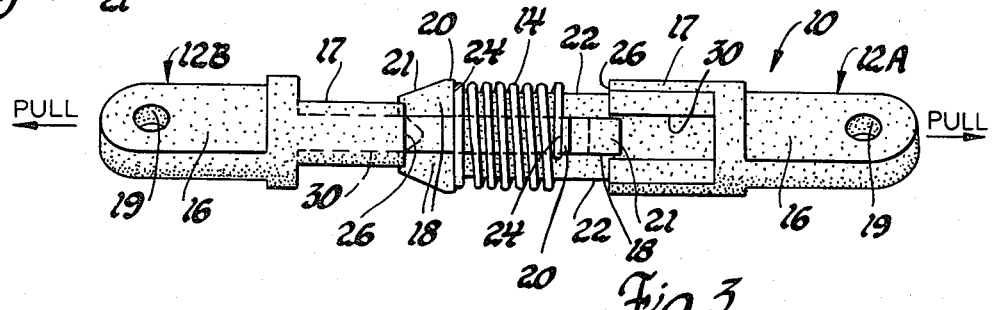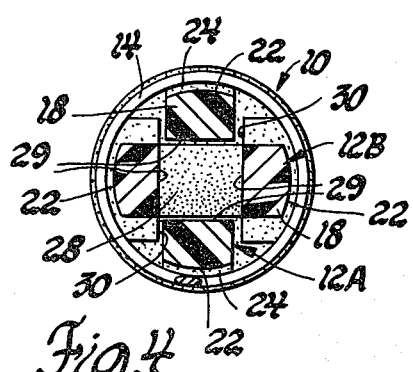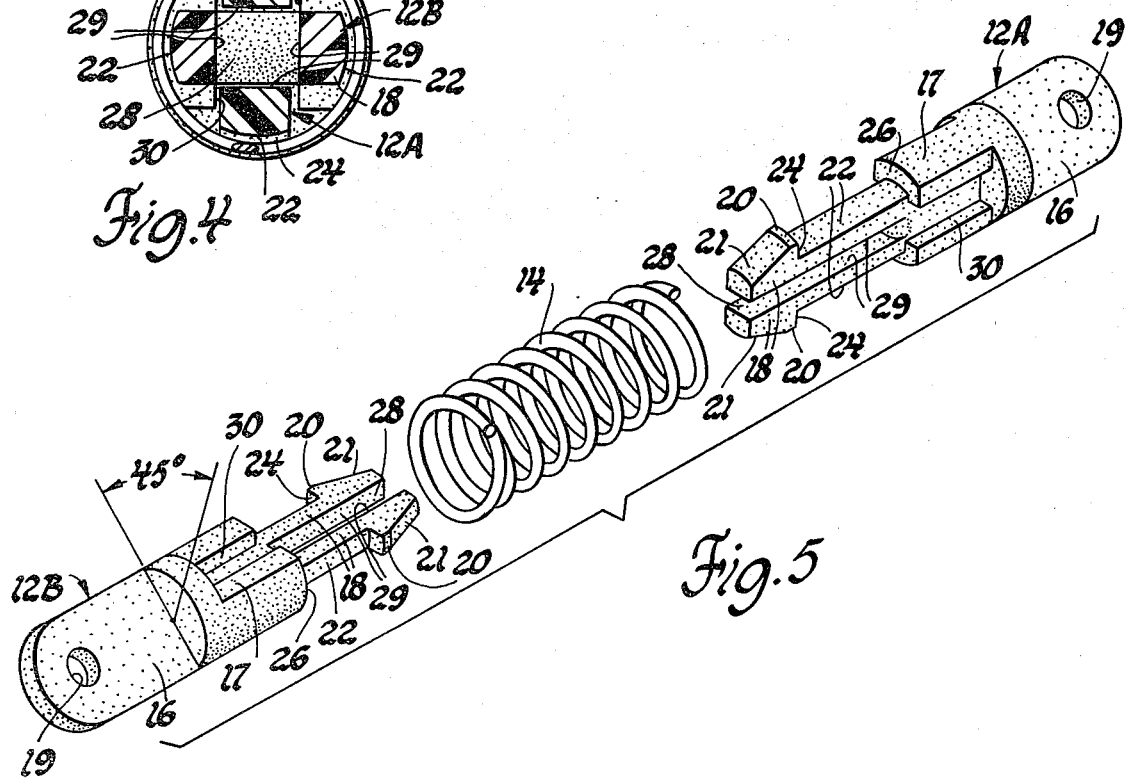

SPRING-BIASED LOST-MOTION LINK ASSEMBLY

This invention relates to a spring-biased lost-motion link assembly and more particularly to the provision thereof by a pair of interlocking parts with a coil spring therebetween wherein such interlocking parts may be identical.

In certain linkage arrangements such as between oscillating driving and driven levers, it is desirable to provide a connecting link which will transmit a force sufficient to operate the driven lever throughout its travel in either direction (push or pull) and then contract or extend in some manner (lost motion) to allow a certain amount of over or undertravel of the driving lever after the driven lever has reached its travel limits or stops. So-called lost-motion links are commonly employed to provide such linkage operation, however, they typically comprise many parts with one or more of these parts requiring several steps in their manufacture.

According to the present invention, there is provided a spring-biased lost-motion link assembly simply comprising two interlocking link members with a coil spring therebetween and wherein such interlocking link members may be identical and manufactured in one step such as by plastic injection molding. Each of the link members has a forked end with two prongs with each prong having an outer edge with an outwardly facing longitudinally extending recess forming an accommodating space for the spring with spring seat portions at the opposite ends thereof. The prongs on each link member are inwardly deflectable toward each other sufficiently to allow their insertion one member at a time through the spring. Then on release of the deflecting force the prongs assume their normal undeflected state entrapping the spring in the recesses on both prongs with the spring seat portions of the recesses on both prongs opposite the respective ends of the spring. The prongs on each link member further have a longitudinally extending space therebetween which is sufficiently wide in their normal undeflected state to accommodate deflection of the prongs on the other link member so that the prongs on one link member can first be inserted in the spring and the prongs on the other link member can next be inserted thereby entrapping the spring in all the recesses opposite all the seat portions. Each link member further has a pair of longitudinally extending grooves for receiving a terminal portion of the prongs on the other link member to both establish and maintain alignment of the link members and prevent inward prong deflection and thereby disengagement of the prongs from the spring, i.e. provide interlocking of the link members as well as maintain entrapment of the spring. With such interrelationship, the interlocking link members are effective to transmit both a push and pull force up to a predetermined force level and then permit relative longitudinal movement between the interlocking link members by compressive action of the spring between the seat portions upon encountering forces above such predetermined push-pull force to thereby provide lost-motion in the linkage permitting over or undertravel.

These and other objects and advantages of the present invention will become more apparent from the following description and drawing in which:

FIG. 1 is a side view of the preferred embodiment of the spring-biased lost-motion link assembly according to the present invention, the link assembly being shown in its normal state.

FIG. 2 is a view similar to FIG. 1 but showing the link assembly in a contracted state.

FIG. 3 is a view similar to FIG. 1 but showing the link assembly in an extended state.

FIG. 4 is an enlarged cross-sectional view taken along the line 4—4 in FIG. 1.

FIG. 5 is an exploded view of the link assembly in FIG. 1.

In the preferred construction, the spring-biased lost-motion link assembly according to the present invention and generally designated as 10 comprises only three parts; namely, a pair of interlocking link members 12A and 12B and a helical-coil compression spring 14 operatively arranged therebetween. The design or shape of the interlocking link members 12A and 12B is such as described in detail later that they may be identical as shown. Moreover, they can be manufactured in a single step such as by being formed of plastic in an injection molding machine. The interlocking link members 12A and 12B have three main structural features; namely an attaching lug 16 at one end, a grooved middle portion 17 and a pair of longitudinally extending parallel legs or prongs 18 at the thus forked other end. Each of the lugs 16 is flat and formed with an attaching hole 19 by which the link assembly may be connected in a linkage system, for example between driving and driven levers (not shown). Each of the prongs 18 has an outer edge 20 with a chamfered spring entry or insertion end 21 and a longitudinally extending outwardly facing notch or recess 22 for forming an accommodating space for the spring 16 with spring seat portions 24 and 26 at the opposite ends thereof. The prongs 18 on each link member are forcibly inwardly deflectable toward each other sufficiently to allow their insertion with the aid of the chamfered ends 21, one link member at a time, through the spring and then on release of the deflecting force assume a normally undeflected state entrapping the spring in the notch 22 on both prongs with the prongs' spring seat portions 24 and 26 opposite the respective ends of the spring. The prongs 18 on each link member have a longitudinally extending space 28 between their oppositely facing inner edges 29 slightly larger than the width of the prongs to accommodate deflection of the prongs on the other link member so that the prongs on one link member can first be inserted in the spring and then the prongs on the other link member can next be inserted thereby entrapping the spring in all the notches opposite all the seat portions of the two link members.

Moreover, the link members have a pair of longitudinally extending grooves 30 which face outwardly from and are at right angles to the plane of the prongs 18. The grooves 30 are for receiving a terminal portion of the prongs on the other link member in their normal undeflected state with the spring 14 assembled thereon to both establish and maintain alignment of the link members and prevent inward prong deflection and thereby disengagement of the prongs from the spring, i.e. provide interlocking and spring retention. Thus entrapment of the spring is maintained and the link members with such interrelationship are effective to transmit both a push and pull force without relative longitudinal movement of the prongs 18 in their respective slots 30 below a predetermined push-pull force (see FIG. 1). On the other hand, above such predetermined push-pull force, the spring will be compressed in either event with the prongs 18 sliding in their grooves 30 and the link assembly contracting as shown in FIG. 2 on encountering an excessive pushing force and extending as shown in FIG. 3 on encountering an excessive pulling force. As can be seen in FIGS. 2 and 3, during such lost-motion travel the spring is compressed between the spring seats on one link member and those at the opposite end of the spring on the other link member whether the link assembly is pushing or pulling and with the spring always in compression.

Another feature of the link assembly is that by locating each of the lugs 16 at an angle of 45° from the plane of their legs or prongs 18, both lugs are then located in the same plane in the link assembly which is desirable for certain link connections. The lugs could also be located in the same plane as their respective legs and thus at 90° to each other in the link assembly where such angling of the attachment points of the link assembly is desired. And it will be further understood that intermediate lug angles are also possible.

The above described preferred embodiment is illustrative of the invention which may be modified within the scope of the appended claims.

The embodiments of the invention in which an exclusive property or privilege is claimed are defined as follows:

1. A spring-biased lost-motion link assembly comprising a pair of interlocking substantially identical link members and a helical-coil compression spring operatively arranged therebetween, each said link member having a forked end with two prongs, each said prong having a pair of spring seats spaced therealong, the prongs on each link member being forcibly inwardly deflectable toward each other sufficiently to allow their insertion one link member at a time through said spring and then on release of the deflecting force assuming a normal undeflected state entrapping said spring between the springs seats on both prongs opposite the respective ends of said spring, the prongs on each link member having a longitudinally extending space therebetween sufficiently wide in their normal undeflected state to accommodate deflection of the prongs on the other link member so that the prongs on one link member can first be inserted in said spring and then the prongs on the other link member can next be inserted thereby entrapping said spring opposite all said seats, and each said link member further having a pair of longitudinally extending grooves for receiving a terminal portion of the prongs on the other link member in their normal undeflected state with said spring assembled thereon to thereby define a tongue and groove interlock between said link members to both establish and maintain alignment of said link members and prevent inward prong deflection and thereby disengagement of said prongs from said spring whereby entrapment of said spring is maintained and said link members are effective to transmit both a push and pull force without relative longitudinal movement between said link members below a predetermined push or pull force and permit limited relative longitudinal movement between said link members contracting or extending the link assembly by compressive action of said spring between said seats upon encountering forces above said predetermined push or pull force.

2. A spring-biased lost-motion link assembly comprising a pair of interlocking link members and a helical-coil compression spring operatively arranged therebetween, each said link member having a forked end with two prongs, each said prong having an outer edge with a longitudinally extending outwardly facing recess forming an accommodating space for said spring with spring seat portions at the opposite ends thereof, the prongs on each link member being forcibly inwardly deflectable toward each other sufficiently to allow their insertion one link member at a time through said spring and then on release of the deflecting force assuming a normal undeflected state entrapping said spring in the recesses on both prongs with the spring seat portions of the recesses on both prongs opposite the respective ends of said spring, the prongs on each link member having a longitudinally extending space therebetween sufficiently wide in their normal undeflected state to accommodate deflection of the prongs on the other link member so that the prongs on one link member can first be inserted in said spring and then the prongs on the other link member can next be inserted thereby entrapping said spring in all said recesses opposite all said seat portions, and each said link member further having a pair of longitudinally extending grooves for receiving a terminal portion of the prongs on the other link member in their normal undeflected state with said spring assembled thereon to thereby define a tongue and groove interlock between said link members to both establish and maintain alignment of said link members and prevent inward prong deflection and thereby disengagement of said prongs from said spring whereby entrapment of said spring is maintained and said link members are effective to transmit both a push and pull force without relative longitudinal movement between said link members below a predetermined push or pull force and permit limited relative longitudinal movement between said link members contracting or extending the link assembly by compressive action of said spring between said seat portions upon encountering forces above said predetermined push or pull force.

* * * * *